United States Patent
Candelaria et al.

(10) Patent No.: US 10,303,380 B2
(45) Date of Patent: May 28, 2019

(54) EXTENT-LEVEL RESERVE AND RELEASE FOR A DIRECT ACCESS STORAGE DEVICE (DASD) VOLUMES

(71) Applicant: International Business Machines Corporation, Armonk, NY (US)

(72) Inventors: Susan K. Candelaria, Tucson, AZ (US); Clint A. Hardy, Tucson, AZ (US); Gavin S. Johnson, San Jose, CA (US); Matthew J. Kalos, Tucson, AZ (US); Michael J. Koester, Hollister, CA (US); John R. Paveza, Morgan Hill, CA (US); Carrie J. Van Noorden, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 14/301,178

(22) Filed: Jun. 10, 2014

(65) Prior Publication Data
US 2015/0355860 A1    Dec. 10, 2015

(51) Int. Cl.
G06F 3/06    (2006.01)

(52) U.S. Cl.
CPC .......... *G06F 3/0622* (2013.01); *G06F 3/0637* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 6,304,980 B1 | 10/2001 | Beardsley et al. | |
| 7,536,501 B2 | 5/2009 | Fisher et al. | |
| 8,126,846 B2 | 2/2012 | Arai et al. | |
| 8,959,312 B2 * | 2/2015 | Acharya | G06F 3/0605 711/203 |
| 2002/0069335 A1 | 6/2002 | Flylnn, Jr. | |
| 2003/0037071 A1 * | 2/2003 | Harris | G06F 11/2089 |

(Continued)

FOREIGN PATENT DOCUMENTS

JP    62160545    7/1987

OTHER PUBLICATIONS

Grossman, C.P., "Role of the DASD storage control in an Enterprise Systems Connection environment," IBM Systems Journal, vol. 31, No. 1, 1992, pp. 123-146.

(Continued)

*Primary Examiner* — Gary W. Cygiel
(74) *Attorney, Agent, or Firm* — Zilka-Kotab, P.C.

(57) ABSTRACT

In one embodiment, a computer program product for managing a reserve command includes a computer readable storage medium having program code embodied therewith, the program code readable and/or executable by a processor to receive, by the processor, a request to access a data set on one or more volumes of at least one direct access storage device (DASD), the request including a reserve command, and each of the one or more volumes including a consecutive set of one or more tracks of the at least one DASD, and reserve one or more extents of the at least one DASD while reserving less than a volume of the at least one DASD and not allowing any other entity than an entity which requested the reserve to access the one or more extents of the at least one DASD that have been reserved.

20 Claims, 5 Drawing Sheets

(56) References Cited

U.S. PATENT DOCUMENTS

| | | |
|---|---|---|
| 2005/0066076 A1 | 3/2005 | Best et al. |
| 2009/0049235 A1 | 2/2009 | Schreiber et al. |
| 2012/0124287 A1* | 5/2012 | Shibayama ........... G06F 3/0608 711/114 |
| 2012/0246277 A1 | 9/2012 | Candelaria et al. |
| 2014/0101394 A1* | 4/2014 | Johri ....................... G06F 12/00 711/154 |

OTHER PUBLICATIONS

Seawright et al., "VM/370—a study of multiplicity and usefulness," IBM Systems Journal, vol. 18, No. 1, 1979, pp. 4-17.

\* cited by examiner

EXTENT-LEVEL RESERVE AND RELEASE FOR A DIRECT ACCESS STORAGE DEVICE (DASD) VOLUMES

BACKGROUND

The present invention relates to, and more particularly, this invention relates to providing extent-level Reserve and Release for direct access storage device (DASD) volumes in a data storage system.

Many different operating systems may be used to manage storage devices. Some exemplary operating systems include IBM z/OS, Linux, Unix, MICROSOFT Windows, etc. Data is stored to physical data storage devices, such as DASDs, magnetic tape, etc., in one or more data sets. When data is stored to a DASD, such as a hard disk drive (HDD), solid state storage device (SSD), etc., the data set may be comprised of one or more extents on the DASD, while multiple data sets may be spread across one or more DASD volumes. Each data set may be of a fixed or variable length.

A storage controller coordinates access to various storage devices that are accessible to one or more host servers (mainframes). The host operating system issues a Reserve [Volume] command when it is required to serialize access while it performs updates to the file directory, such as a volume table of contents (VTOC), associated with this volume. The Reserve command limits access to the DASD volume (or directory) to the host system that issued the Reserve command. Only applications on the reserving host system are allowed to access a reserved volume. To protect the tile directory, the operating system locks the file directory (using an enqueue). This prevents user applications on the reserving system from accessing the directory white the operating system updates the directory.

No application running on any other attached host can access any data on the volume until a Release command is issued. The fact that the Reserve/Release only allows one application, or host operating system, at a time to access the DASD volume can clearly result in performance problems. Other applications that need access to other data on the DASD volume have to wait until a Release is performed. Even if the application that issued the Reserve is only reading the data from a single data set, no other data on the volume can be accessed.

In this configuration, multiple host operating systems can have access to a particular DASD volume or set of volumes. The operating system has software that will maintain a Reserve on a volume if other applications running on the system have an outstanding Reserve request for that volume. In effect, one host operating system is allowed to monopolize a DASD volume and "starve" all the other attached host operating systems and prevent them from accessing any data on the volume.

SUMMARY

In one embodiment, a computer program product for managing a reserve command includes a computer readable storage medium having program code embodied therewith, the program code readable and/or executable by a processor to cause the processor to: receive, by the processor, a request to access a data set on one or more volumes of at least one direct access storage device (DASD), wherein the request includes a reserve command, and wherein each of the one or more volumes includes a consecutive set of one or more tracks of the at least one DASD, and reserve, by the processor, one or more extents of the at least one DASD, wherein less than a volume of the at least one DASD is reserved, and wherein the reserve does not allow any other entity than an entity which requested the reserve to access the one or more extents of the at least one DASD that have been reserved.

In another embodiment, a system includes a processor and logic integrated with and/or executable by the processor, the logic being configured to: receive a request to access a data set on one or more volumes of at least one DASD, wherein the request includes a reserve command, and wherein each of the one or more volumes includes a consecutive set of one or more tracks of the at least one DASD, and reserve one or more extents of the at least one DASD, wherein less than a volume of the at least one DASD is reserved, and wherein the reserve does not allow any other entity than an entity which requested the reserve to access the one or more extents of the at least one DASD that have been reserved.

In yet another embodiment, a method includes receiving a request to access a data set on one or more volumes of at least one DASD, wherein the request includes a reserve command, and wherein each of the one or more volumes includes a consecutive set of one or more tracks of the at least one DASD, and reserving one or more extents of the at least one DASD, wherein less than a volume of the at least one DASD is reserved, and wherein the reserving includes not allowing any other entity than an entity which requested the reserve to access the one or more extents of the at least one DASD that have been reserved.

Other aspects and embodiments of the present invention will become apparent from the following detailed description, which, when taken in conjunction with the drawings, illustrate by way of example the principles of the invention.

DETAILED DESCRIPTION

Figure 1:
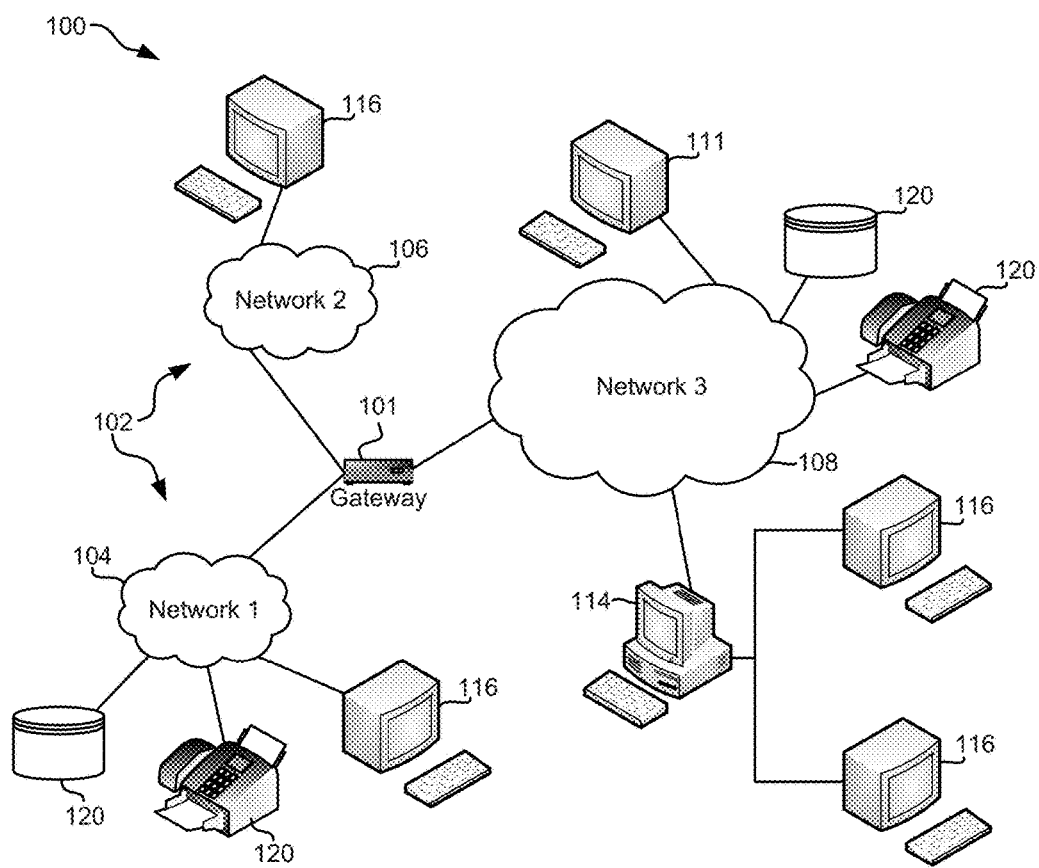
FIG. 1 illustrates a network architecture, in accordance with one embodiment

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one approach, more granular Reserve and Release functions are provided which are capable of extent-level locking of data on a volume of a direct access storage device (DASD). This extent-level locking may be utilized in response to receiving a command to reserve or release one or more extents on a volume of a DASD, as opposed to the entire volume of the DASD. This more granular reserve and release functionality allows for concurrent access to other portions of the volume since less than the entire volume is reserved. Furthermore, specific portions of the volume may be reserved in a more focused approach, such as a number of extents and/or a number of tracks of the DASD.

In one general embodiment, a computer program product for managing a reserve command includes a computer readable storage medium having program code embodied therewith, the program code readable and/or executable by a processor to cause the processor to: receive, by the processor, a request to access a data set on one or more volumes of at least one direct access storage device (DASD), wherein the request includes a reserve command, and wherein each of the one or more volumes includes a consecutive set of one or more tracks of the at least one DASD, and reserve, by the processor, one or more extents of the at least one DASD, wherein less than a volume of the at least one DASD is reserved, and wherein the reserve does not allow any other entity than an entity which requested the reserve to access the one or more extents of the at least one DASD that have been reserved.

In another general embodiment, a system includes a processor and logic integrated with and/or executable by the processor, the logic being configured to: receive a request to access a data set on one or more volumes of at lea one DASD, wherein the request includes a reserve command, and wherein each of the one or more volumes includes a consecutive set of one or more tracks of the at least one DASD, and reserve one or more extents of the at least one DASD, wherein less than a volume of the at least one DASD is reserved, and wherein the reserve does not allow any other entity than an entity which requested the reserve to access the one or more extents of the at least one DASD that have been reserved.

In yet another general embodiment, a method includes receiving a request to access a data set on one or more volumes of at least one DASD, wherein the request includes a reserve command, and wherein each of the one or more volumes includes a consecutive set of one or more tracks of the at least one DASD, and reserving one or more extents of the at least one DASD, wherein less than a volume of the at least one DASD is reserved, and wherein the reserving includes not allowing any other entity than an entity which requested the reserve to access the one or more extents of the at least one DASD that have been reserved.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware, Coupled to each data server 114 is a plurality of user devices 116. Such user devices 116 may include a desktop computer, laptop computer, handheld computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster f systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
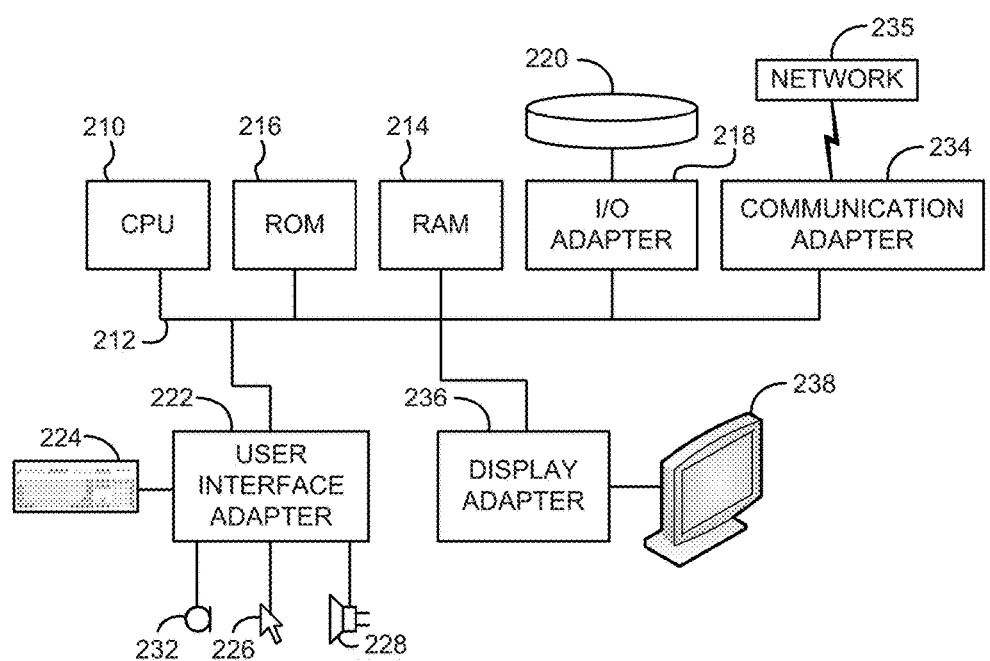
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used, Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

Figure 3:
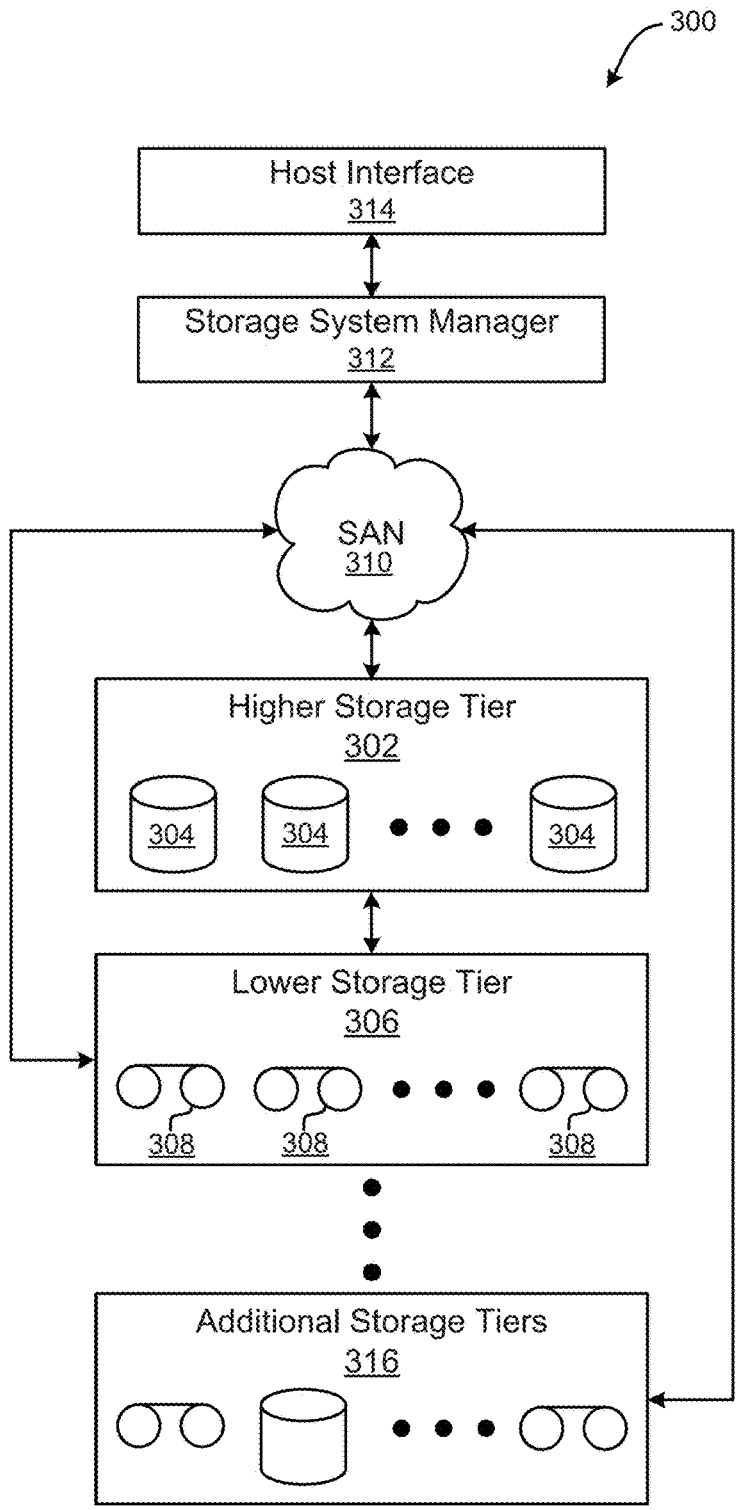
FIG. 3 is a simplified block diagram of a tiered data storage system, according to one embodiment.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be apart of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including tower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a tower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
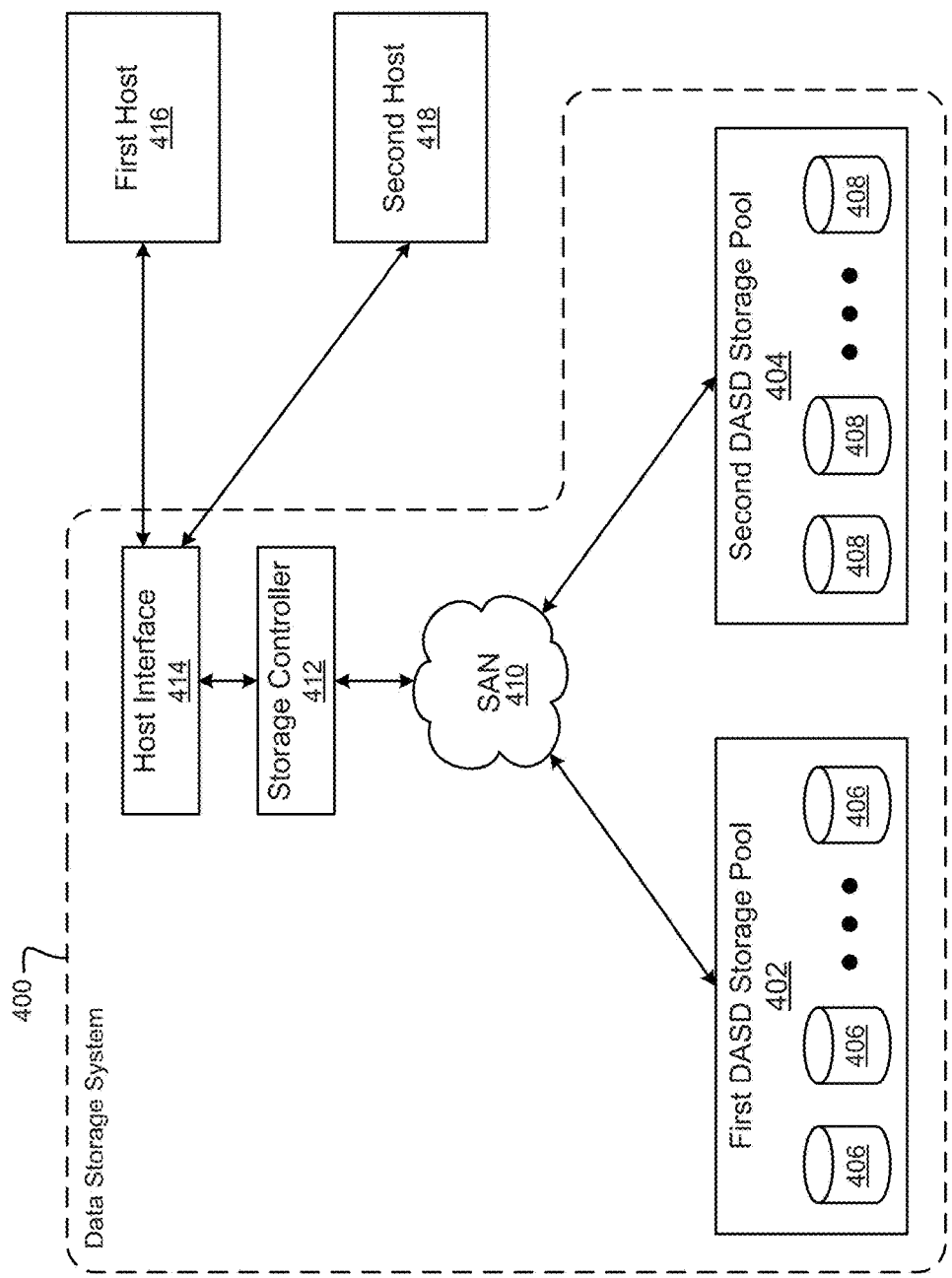
FIG. 4 is a simplified diagram of a data storage system in accordance with one embodiment.

With reference to FIG. 4, a data storage system 400 is described according to one embodiment. As shown, the data storage system 400 includes one or more DASD storage pools 402, 404. The first DASD storage pool 402 includes a plurality of first DASDs 406, and the second DASD storage pool 404 includes a plurality of second DASDs 408. Any type of DASD known in the art may be used in the storage pools, such as HDDs, SSDs, Flash memory, optical drives, etc. The data storage system 400 also includes a storage area network (SAN) 410 which is configured to connect the DASD storage pools 402, 404 with a storage controller 412.

The first DASD storage pool 402 may be located remote from the second DASD storage pool 404, such that data may be stored in remotely located storage without a user of the storage needing to know where the data is actually being stored. Also, when data is stored to one or more of the DASD storage pools 402, 404, the data may be stored as one or more data sets, each data set comprising one or more extents on one or more volumes of the various DASDs 406, 408 in any of the DASD storage pools 402, 404. In this way, data stored in a single data set may be stored across two DASD storage pools which may be remotely located from one another, and across various DASDs 406, 408 in the DASD storage pools 402, 404.

In addition, a representation of the various storage locations for data in the data storage system 400 may be virtualized, such that a plurality of logical volumes may be presented to a user, the logical volumes having a plurality of logical extents thereon this way, an administrator, application, the storage controller 412, the operating system, or some other entity with authority to determine distribution of data in the data storage system 400 may determine how to represent the available storage to a user of the data storage system 400. How the logical volumes and logical extents are actually mapped to the physical volumes and physical DASDs 406, 408 in the various DASD storage pools 402, 404 may be determined based on any number of factors, such as requirements of application and/or users, operating system requirements, available storage, or any other factor known in the art.

The storage controller 412 is configured to interface with the various :DASD storage pools 402, 404 as well as a host interface 414. The storage controller 412 is also configured to manage the distribution of data stored to the various DASDs 406, 408 in any of the DASD storage pools 402, 404, which includes writing, deleting, modifying, searching, determining status, etc., among other management tools known in the art. The storage controller 412 is further configured to create and maintain an index of all data stored to the various DASDs 406, 408 in any of the DASD storage pools 402, 404, including various amounts of information pertaining to that data, such as which extents are included in each data set, a start address for each extent, an end address for each extent, etc.

The host interface 414 is configured to allow the storage controller 412 to communicate with various host systems, such as a first host 416, a second host 418, etc. The host interface 414 may be integral to the storage controller 412, may be a stand-alone module, or may be included in some other system or interface of the data storage system 400, in various embodiments. The host systems 416, 418 may send requests to read data, write data, and/or otherwise modify existing data, to the storage controller 412 via the host interface 414, and may receive data and/or confirmation of writing, modifying, deleting, etc., from the storage controller 412 via the host interface 414. The requests may include a data set identifier, or some other identifying information that may be used by the storage controller 412 to find the data on the various DASDs 406, 408 in any of the DASD storage pools 402, 404.

The storage controller 412, in response to receiving a request from one of the hosts 416, 418 may determine eligibility for the host to access the referenced data. When the host is allowed to access the referenced data, the storage controller 412 may then determine a storage location for the referenced data in the request, such as via the index or some other technique known in the art, such as an exhaustive search, etc.

According to one embodiment, one or more volumes of one or more DASDs 406, 408 in at least one DASD storage pool 402, 404 may be shared with more than one host 416, 418. This may cause a situation to arise where a host, such as the first host 416 may issue a command to access a first data set stored on one of the DASDs, such as a DASD 406 in the first DASD storage pool 402. The command my be to write to or modify the first data set on the DASD 406. This causes the storage controller 412 to issue a Reserve command for the volume(s) where the first data set is stored. Then, if another host, such as the second host 418, issues a command to access the first data set, or a second data set which happens to be stored on at least one volume common to the volume(s) on which the first data set is stored, the storage controller 412 will hold (delay) the second request from the second host 418 until the first host 416 releases the volume(s) on which the first data set is stored. This leads to inefficiencies in accessing data stored in the data storage system 400.

Therefore, in order to overcome these limitations, an extent-level Reserve may be used by the storage controller 412 and the various DASDs 406, 408 in all of the DASD storage pools 402, 404 to reserve only those extents which are affected by the access command, instead of locking the entire volume, as is typically done. The extent-level Reserve (or lock) may reserve (lock out any other entity other than the entity which holds the Reserve) all extents on which the requested data set is stored in one embodiment. In another embodiment, the extent-level Reserve may reserve those extents which will be modified and on which the requested data set is stored without serving other, non-affected extents where other portions of the data set are stored.

The extent-level Reserve command allows a host 416, 418 (e.g., via an operating system of the host), application (running on a host or some other local or remote system), storage controller 412, etc., to specify an area of the volume that is to be reserved. That is, the command informs the DASD which extent(s), track(s), etc., that are to be reserved for the requesting entity. The remainder of the volume remains accessible to all attached hosts, applications running on the same operating system, etc. This greatly reduces the performance impact of typical volume-level Reserve/Release mechanisms.

Figure 5:
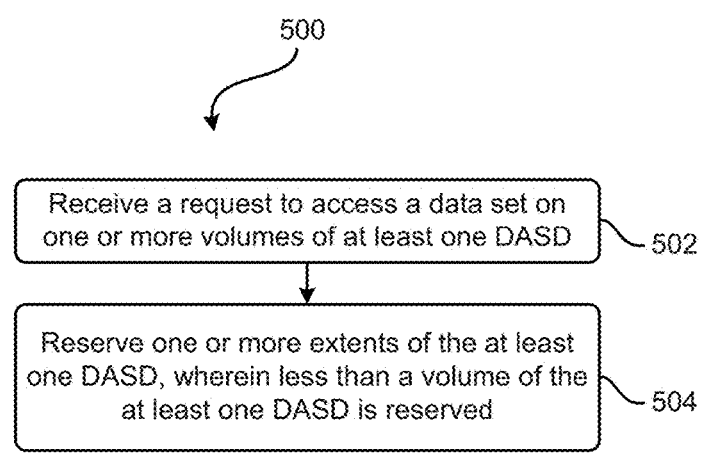
FIG. 5 is a flowchart of a method, according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a mainframe, a server, a storage controller, an operating system of a storage system, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to access a data set on one or more volumes of at least one DASD is received. The request includes a reserve command, and each of the one or more volumes includes a consecutive set of one or more tracks of the at least one DASD.

In one embodiment, the data set may include at least one extent of the at least one DASD. Typically, the data set may include a plurality of extents across one or more DASDs.

In operation 504, one or more extents of the at least one DASD are reserved, while less than a volume of the at least one DASD is reserved. The reserving includes not allowing any other entity than an entity which requested the reserve (such as a host operating system or some other entity having authority to request a reserve) to access the one or more extents of the at least one DASD that have been reserved.

In one embodiment, the reserve may be executed on a directory which includes the data set. In another embodiment, the reserve may be executed on a group of extents which include the data set. In even another embodiment, the one or more extents which are reserved include only those extents which will be modified by the request to access the data set while other extents that comprise the data set are not reserved.

Of course, any other extent-level reserve may be executed as would be desired by one of skill in the art.

The method 500 may further include receiving a release command (from the entity which requested, and now holds, the reserve , and releasing the one or more extents of the at least one DASD in response to the release command being received.

In one embodiment, the request to access the data set may be received from a host (e.g., an operating system of the host) via a storage controller or some other intermediary device configured to handle such requests. In a further embodiment, access to the data set may include at least one of: reading at least a portion of the data set, writing to at least a portion of the data set, and modifying at least a portion of the data set. Of course, any other access to the data set may be provided, as would be understood by one of skill in the art upon reading the present descriptions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media tight pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other program able data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art, Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following eta s and their equivalents.

What is claimed is:

1. A computer program product for managing a reserve command, the computer program product comprising a computer readable storage medium having program code embodied therewith, the program code readable by a processor, executable by the processor, or readable and executable by the processor to cause the processor to:
    create, by the processor, an index of a plurality of data sets, the data sets each including data that is stored within a plurality of physical direct access storage device (DASD) volumes, where the index identifies, for each of the plurality of data sets, one or more extents on which the data set is stored within the plurality of physical DASD volumes, a start address for each of the one or more extents within the physical DASD volume, and an end address for each of the one or more extents within the physical DASD volume;
    receive from a host system, by the processor, a request to access one of the plurality of data sets, the request including an identification of the one of the plurality of data sets and a reserve command;
    determine, by the processor, an eligibility for the host system to access the one of the plurality of data sets;
    in response to determining that the host system is allowed to access the one of the plurality of data sets, determine, by the processor, a plurality of extents on which the one of the plurality of data sets is stored within one or more of the plurality of physical DASD volumes, utilizing the identification of the one of the plurality of data sets and the index of the plurality of data sets stored within the plurality of physical DASD volumes; and
    reserve, by the processor, a portion of the plurality of extents on which the one of the plurality of data sets is stored within the plurality of physical DASD volumes, wherein only a portion of one or more of the plurality of physical DASD volumes is reserved and another portion of the one or more of the plurality of physical DASD volumes is not reserved,
    wherein the portion of the plurality of extents which are reserved include only those extents which will be modified by the request to access the one of the plurality of data sets and exclude another portion of the plurality of extents on which the one of the plurality of data sets is stored that stores portions of the one of the plurality of data sets that are not affected by the request, and
    wherein the reserving does not allow any other entity than the host system to access the plurality of extents within the plurality of physical DASD volumes that have been reserved.

2. The computer program product as recited in claim 1, wherein the program code is further readable by the processor, executable by the processor, or-readable and executable by the processor to cause the processor to:
    receive, by the processor, a release command from the host system for the plurality of extents on which the one of the plurality of data sets is stored; and
    release, by the processor, the plurality of extents on which the one of the plurality of data sets is stored within the plurality of physical DASD volumes in response to receiving the release command.

3. The computer program product as recited in claim 1, wherein the plurality of extents on which the one of the plurality of data sets is stored includes extents located within multiple different physical DASD volumes.

4. The computer program product as recited in claim 1, wherein a storage representation of the plurality of data sets is virtualized to a host system, by the processor, utilizing a plurality of logical volumes and a plurality of logical extents that are mapped to the plurality of physical DASD volumes.

5. The computer program product as recited in claim 1, wherein the reserve is executed on a volume table of contents (VTOC) of one or more of the plurality of physical DASD volumes on which the one of the plurality of data sets is stored.

6. The computer program product as recited in claim 1, wherein the request to access the one of the plurality of data sets includes a request to modify a portion of the one of the plurality of data sets.

7. A system, comprising:
    a processor; and
    logic integrated with the processor, executable by the processor, or integrated with and executable by the processor, the logic being configured to:
    create an index of a plurality of data sets, the data sets each including data that is stored within a plurality of physical direct access storage device (DASD) volumes, where the index identifies, for each of the plurality of data sets, one or more extents on which the data set is stored within the plurality of physical DASD volumes, a start address for each of the one or more extents within the physical DASD volume, and an end address for each of the one or more extents within the physical DASD volume;
    receive from a host system a request to access one of the plurality of data sets, the request including an identification of the one of the plurality of data sets and a reserve command;
    determine, by the processor, an eligibility for the host system to access the one of the plurality of data sets;
    in response to determining that the host system is allowed to access the one of the plurality of data sets, determining a plurality of extents on which the one of the plurality of data sets is stored within one or more of the plurality of physical DASD volumes, utilizing the identification of the one of the plurality of data sets and the index of the plurality of data sets stored within the plurality of physical DASD volumes; and reserve a portion of the plurality of extents on which the one of the plurality of data sets is stored within the plurality of physical DASD volumes, wherein only a portion of one or more of the plurality of physical DASD volumes is reserved and another portion of the one or more of the plurality of physical DASD volumes is not reserved, wherein the portion of the plurality of extents which are reserved include only those extents which will be modified by the request to access the one of the plurality of data sets and exclude another portion of the plurality of extents on which the one of the plurality of data sets is stored that stores portions of the one of the plurality of data sets that are not affected by the request, and wherein the reserving does not allow any other entity than the host system to access the plurality of extents within the plurality of physical DASD volumes that have been reserved.

8. The system as recited in claim 7, wherein the logic is further configured to:
receive a release command from the host system for the plurality of extents on which the one of the plurality of data sets is stored; and
release the plurality of extents on which the one of the plurality of data sets is stored within the plurality of physical DASD volumes in response to receiving the release command.

9. The system as recited in claim 7, wherein the plurality of extents on which the one of the plurality of data sets is stored includes extents located within multiple different physical DASD volumes.

10. The system as recited in claim 7, wherein a storage representation of the plurality of data sets is virtualized to a host system utilizing a plurality of logical volumes and a plurality of logical extents that are mapped to the plurality of physical DASD volumes.

11. The system as recited in claim 7, wherein the reserve is executed on a volume table of contents (VTOC) of one or more of the physical DASD volumes on which the one of the plurality of data sets is stored.

12. The system as recited in claim 7, wherein the request to access the one of the plurality of data sets includes a request to modify a portion of the one of the plurality of data sets.

13. The system as recited in claim 7, wherein access to the one of the plurality of data sets is selected from a group consisting of: reading at least a portion of the one of the plurality of data sets, writing to at least a portion of the one of the plurality of data sets, and modifying at least a portion of the one of the plurality of data sets.

14. A method, comprising:
creating an index of a plurality of data sets, the data sets each including data that is stored within a plurality of physical direct access storage device (DASD) volumes, where the index identifies, for each of the plurality of data sets, one or more extents on which the data set is stored within the plurality of physical DASD volumes, a start address for each of the one or more extents within the physical DASD volume, and an end address for each of the one or more extents within the physical DASD volume;

receiving from a host system a request to access one of the plurality of data sets, the request including an identification of the one of the plurality of data sets and a reserve command;

determining an eligibility for the host system to access the one of the plurality of data sets;

in response to determining that the host system is allowed to access the one of the plurality of data sets, determining a plurality of extents on which the one of the plurality of data sets is stored within one or more of the plurality of physical DASD volumes, utilizing the identification of the one of the plurality of data sets and the index of the plurality of data sets stored within the plurality of physical DASD volumes; and reserving a portion of the plurality of extents on which the one of the plurality of data sets is stored within the plurality of physical DASD volumes, wherein only a portion of one or more of the plurality of physical DASD volumes is reserved and another portion of the one or more of the plurality of physical DASD volumes is not reserved, wherein the portion of the plurality of extents which are reserved include only those extents which will be modified by the request to access the one of the plurality of data sets and exclude another portion of the plurality of extents on which the one of the plurality of data sets is stored that stores portions of the one of the plurality of data sets that are not affected by the request, and wherein the reserve does not allow any other entity than the host system to access the plurality of extents within the plurality of physical DASD volumes that have been reserved.

15. The method as recited in claim 14, further comprising:
receiving a release command from the host system for the plurality of extents on which the one of the plurality of data sets is stored; and
releasing the plurality of extents on which the one of the plurality of data sets is stored within the plurality of physical DASD volumes in response to receiving the release command.

16. The method as recited in claim 14, wherein the plurality of extents on which the one of the plurality of data sets is stored includes extents located within multiple different physical DASD volumes.

17. The method as recited in claim 14, wherein a storage representation of the plurality of data sets is virtualized to a host system utilizing a plurality of logical volumes and a plurality of logical extents that are mapped to the plurality of physical DASD volumes.

18. The method as recited in claim 14, wherein the reserving is executed on a volume table of contents (VTOC) of one or more of the physical DASD volumes on which the one of the plurality of data sets is stored.

19. The method as recited in claim 18, wherein the request to access the one of the plurality of data sets includes a request to modify a portion of the one of the plurality of data sets.

20. The computer program product as recited in claim 1, wherein the plurality of extents on which the one of the plurality of data sets is stored includes extents located within multiple different physical DASD volumes located within a plurality of different DASD storage pools that are remotely located from each other.

* * * * *